May 31, 1927.

A. L. MURRAY

SHOE BOTTOM

Filed June 25, 1925

Albert L. Murray
INVENTOR.

BY

ATTORNEYS.

May 31, 1927.
A. L. MURRAY
SHOE BOTTOM
Filed June 25, 1925
1,630,445
2 Sheets-Sheet 2
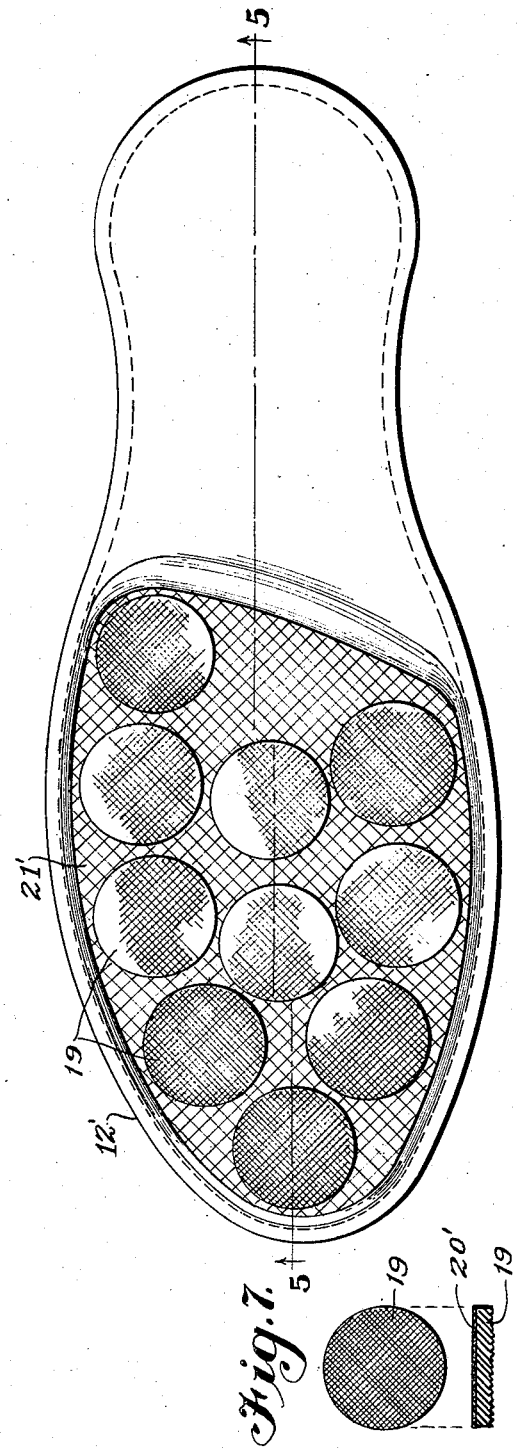
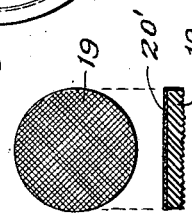
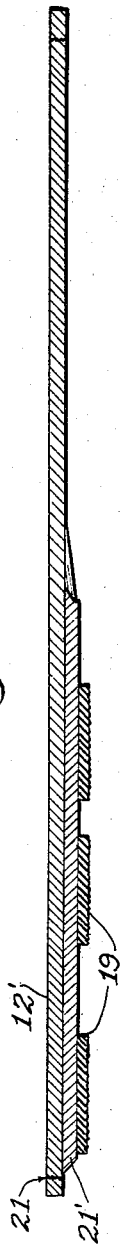
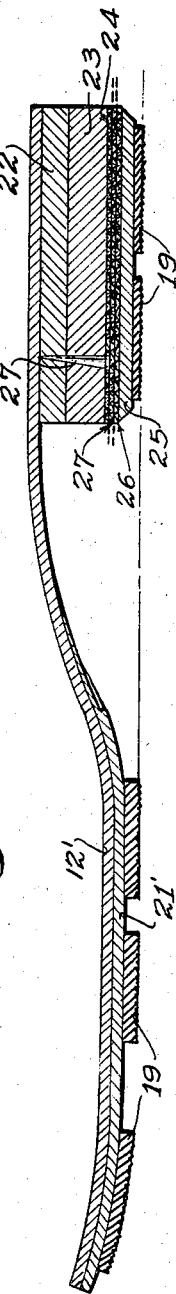
INVENTOR.
Albert L. Murray
BY
ATTORNEYS.

Patented May 31, 1927.

1,630,445

UNITED STATES PATENT OFFICE.

ALBERT L. MURRAY, OF AUBURN, INDIANA.

SHOE BOTTOM.

Application filed June 25, 1925. Serial No. 39,575.

This invention relates to rubber shoe bottoms and by shoe bottoms I mean to include generically, shoe soles and shoe heels whether the same be made as individual elements or are made as a single element. For instance, I may make a heel in accordance with this invention and this would be the rubber shoe bottom in such cases as where the shoes were built only with rubber heels. In other cases I may make a rubber half sole in accordance with this invention and this also would be a shoe bottom. In still other cases I may make a shoe sole in which the entire ground contacting portion is of rubber and in these cases the term shoe bottom would be comprehensive of both heel and sole. My use of the word "rubber" also includes the use of gutta percha, balata and similar rubber-like materials.

One of the objects of the invention is to provide a shoe bottom wherein the ground contacting portion is of a much higher grade of rubber than is commonly used in soles and heels, this object attaining the advantages of greater wear, less thickness of rubber and consequently less weight.

The second object of the invention is to make the parts of shoes subjected to greatest wear of such nature that they may be easily and cheaply renewed without the expense of renewing the entire rubber sole.

The third object of the invention is to adapt certain parts thereof to various uses made necessary by the differences in the grades and cost limitations in shoe manufacture and also to those certain methods of applying rubber soles as used in different shoe factory and repair shop conditions and to the kind and condition of shoes to which the rubber soles are to be applied, that is whether the shoes are in process of manufacture or whether they are to have the rubber sole applied after manufacture and also to the amount of wear which the shoe has had before such application.

A fourth object of the invention is to provide a novel form of rubber shoe bottom wherein the tread or wear surface will be formed of a high grade of rubber having a great elasticity and wear quality and a second portion inseparably connected to this tread portion but of a less elastic character.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 4 is a bottom view of a shoe sole disclosing my invention.

Figure 5 is a section on the line 5—5 of Figure 4.

Figure 6 is a similar section showing a complete shoe sole and heel as constructed in accordance with this invention.

Figure 7 is a detail view showing in bottom plan and section, one of my spuds.

Figure 1:
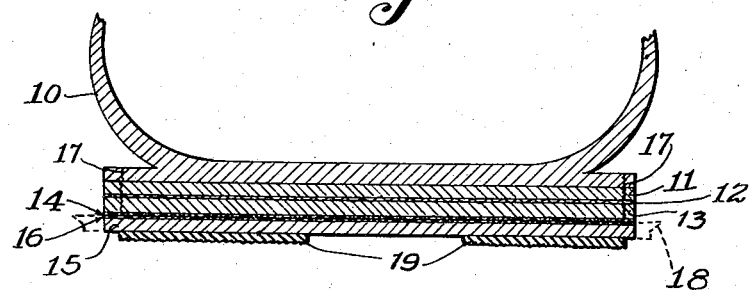
Figure 1 is a section transversely through a shoe sole and a lower part of a shoe showing one form of my invention.

In the showing here made, the shoe upper together with the welt and inner sole are conventionally illustrated at 10, it being understood, of course, that these parts are constructed in the ordinary manner and not all in one piece as shown. This conventional illustration is merely used to bring out the general shape of the parts. In the form shown in Figure 1, there is disclosed the usual sub-sole 11 which is secured in the ordinary manner to the shoe upper 10 and in this construction I preferably roughen that surface of sub-sole 11 which is adjacent to the raw gum 12 so that this roughened surface will readily receive cement.

The sub-sole may be the original leather sole in such cases as those in which the rubber sole is applied after manufacture, or it may be made as a thin sub-sole of any material which will give the desired support and holding power without too great thickness of the entire structure. At 13 is an additional sub-sole which is preferably of relatively cheap vulcanized rubber having raw gum facings 12 and 14 which are vulcanized to this composition sole. There is also provided a bottom or tread layer 15 of high grade vulcanized material having a raw rubber upper surface 16. Preferably this layer 15 is applied after layer 13 is fastened to layer 11 by cement and to the shoe body 10 by stitches 17 running through layers 14, 13, 12, 11 and 10. It will be observed that by reason of the two raw surfaces 14 and 16 being in contact, cement may be used between them and they will be solidly united together and it is also practical by the use of acid curing solution to vulcanize together any two raw rubber surfaces.

In the event of wear when the wear has been sufficient to substantially destroy the layer 15 the remaining parts of that layer may be removed by suitable tooling until the raw rubber surface is reached and then by freshening this raw rubber surface with a solvent or with cement, a new layer 15 can be readily attached. Having in mind that it is not practical for the average shoe maker, repair man or small factory to carry such a wide range of sizes and shapes as will accurately fit the very large number of sizes and shapes of shoes manufactured I preferably for this class of trade, make the renewable part 15 excessively large as shown at 18 so that by using a few master sizes smaller sizes can be trimmed from the same. Moreover I may apply, if I decide certain spuds to the under side of layer 15 and supply renewable spuds of same shape and size and of appropriate thickness, these renewable spuds having a raw gum attaching surface 20' as shown in Figure 7.

Figure 2:
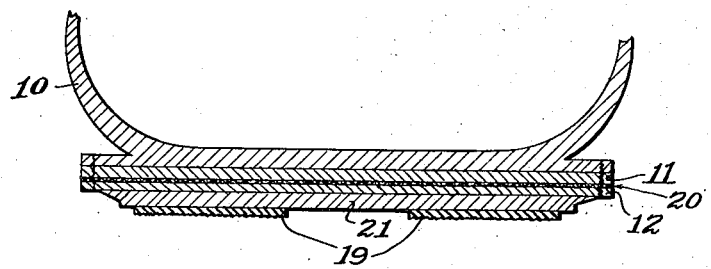
Figure 2 is a similar view showing a second form.

In the form of the invention shown in Figure 2, the sub-sole 11 may be made either of leather or rubber and is fastened to the shoe body 10 by sewing or nails or by both as may be the common practice of the shoe manufacturer or the repair man. Below this sub-sole is a composition sole 12 provided with a raw gum upper surface 20 and to this composition sole is vulcanized a fine rubber sole 21. This fine rubber sole is marginally inset from the edge of the composition sole 12 so as to admit stitching to extend through this margin. The sub-sole 11 has its lower surface roughened to receive cement thus making the union of the raw gum 20. Spuds may also be provided on this sole.

This form of device is especially adapted to a better grade of shoe repair work and manufacture since the layers 20, 12 and 11 are made as an article of manufacture and simply stitched to 10 as shown and also with the advantage of an attractive marginal finish. A sub-sole 11 being provided, this sub-sole may be of leather to provide stiffness and heat resistance, thus making a fine quality shoe in manufacture but by reason of the marginal edge, one that will require comparatively accurate shapes and sizes in order to retain the marginal finish.

Figure 3:
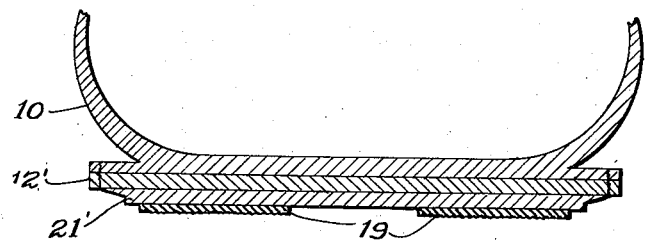
Figure 3 is a similar view showing a third form.

For the cheapest form of sole I provide as shown in Figure 3, a composition sole 12' and tread 21' which corresponds to the parts 12 and 21 of the form shown in Figure 2 and are like the parts in that figure vulcanized together. In this form I make the composition sole 12' of such thickness as may be desired to give the stiffness wanted and this combined composition sole 12' and tread 21' are then stitched to 10. This form may also be provided with spuds 19. Sole 12' may also be leather roughened for cement and free from oil to withstand vulcanizing heat.

As shown in Figure 6, the heel construction differs slightly and yet follows the same idea. In the heel construction usually leather heel 22 commonly called the "heel filler" is employed and is attached to the shoe body in the usual way and to this heel filler is secured a composition heel 23 having a raw gum under-surface 24. The tread of the heel is of fine rubber as shown at 25 and has a raw gum upper surface 26, a strip of holland 27 or the like being interposed between the two during shipment in the position shown in said figure, it being obvious that this strip is removed prior to cementing the two raw rubber surfaces together to form the completed sole and heel. The composition sole 23, is secured to the filler 22 by nails 27. It is also evident and within the scope of my invention that the composition heel 23 can have a layer of raw gum on both surfaces for the purpose of giving a cement union in addition to nails between this composition heel 23 and the heel filler 22 and it is equally evident that the composition heel 23 can simply be made thick enough to do away with the use of the heel filler 22.

The tread portion 25 with its raw gum surface 26 constitutes the renewable part. It is expected that in all cases the holland 27 is merely used to prevent the two raw gums, 24 and 26 from sticking together while in stock and also to prevent air drying to either surface. Before applying the composition heel 23 the holland and tread portion are peeled off and the composition heel is then fastened to the shoe and any necessary trimming is done. The tread portion 25 with its raw gum backing from which the holland is now removed is then applied to the raw gum surfaces 24 and the two are united by cement or acid curing solution. The purpose of the bevel edge of the tread portion 25 is to reduce the amount of trim which is relatively difficult to do on high grade rubber. It is evident that in place of the use of one sheet of holland interposed between raw gum surfaces 26 and 24 I could also use separate sheets of holland to cover raw gum surfaces No. 26 and 24. Preferably the holland strip is made larger than the heel so as to protect marginally and thus allow of it being readily removed.

There has thus been provided a simple and efficient device of the kind described and for the purpose specified.

While I have here illustrated several particular forms, it is to be understood that variations may be made in the exact arrangement of the different layers, these variations being dependent on the particular surface to which the employed article is to be put. Consequently I wish it to be understood that I am not going to limit myself to these particular arrangements but my invention is to be considered broad enough in its scope so as to include all forms which probably come within the spirit of the appended claims.

Having thus described the invention, what is claimed as new, is:

1. A shoe sole having a comparatively soft rubber tread and a comparatively hard rubber welt engaging portion, the soft rubber tread being located in its entirety beneath the hard rubber portion, and renewable rubber spuds secured to the tread surface of said soft rubber tread.

2. A shoe sole including a relatively high grade rubber layer, a raw rubber attaching layer vulcanized to the tread layer, and a relatively low grade rubber sub-sole layer having raw rubber attaching surfaces vulcanized thereto one of which is adhesively connected to the first mentioned attaching surface.

3. In shoe sole and heel construction, a relatively high grade tread layer of vulcanized rubber, a raw rubber attaching layer vulcanized to the upper surface of the tread layer, a second raw rubber attaching layer adhesively connected to the first attaching layer, and a relatively cheap welt engaging subsole to which the second attaching layer is secured.

In testimony whereof I affix my signature.

ALBERT L. MURRAY.